US008516345B2

United States Patent
Quere et al.

(10) Patent No.: US 8,516,345 B2
(45) Date of Patent: Aug. 20, 2013

(54) METHOD FOR RECEIVING DATA STREAMS AND CORRESPONDING METHOD FOR TRANSMISSION

(75) Inventors: Thierry Quere, Montfort sur Meu (FR); Nicolas Debomy, Longaulnay (FR); Jean-Claude Colmagro, Mouaze (FR); Gilles Straub, Acigne (FR)

(73) Assignee: Thomson Licensing (FR)

( * ) Notice: Subject to any disclaimer, the term of this patent is extended or adjusted under 35 U.S.C. 154(b) by 133 days.

(21) Appl. No.: 12/737,259

(22) PCT Filed: Jun. 29, 2009

(86) PCT No.: PCT/EP2009/058127
§ 371 (c)(1),
(2), (4) Date: Mar. 22, 2011

(87) PCT Pub. No.: WO03/049449
PCT Pub. Date: Jun. 12, 2003

(65) Prior Publication Data
US 2011/0179320 A1 Jul. 21, 2011

(30) Foreign Application Priority Data
Jun. 30, 2008 (FR) .................... 08 54400

(51) Int. Cl.
*G06F 11/00* (2006.01)
(52) U.S. Cl.
USPC ...................................... 714/776

(58) Field of Classification Search
USPC ........................................... 714/776
See application file for complete search history.

(56) References Cited

U.S. PATENT DOCUMENTS

| 6,625,776 | B1 * | 9/2003 | Wright et al. ................ 714/774 |
| 2005/0207360 | A1 * | 9/2005 | Costo et al. .................... 370/282 |
| 2006/0072837 | A1 | 4/2006 | Ralston et al. |
| 2006/0184860 | A1 * | 8/2006 | Takagi .......................... 714/774 |
| 2010/0091747 | A1 * | 4/2010 | Dorsey et al. ................ 370/338 |

FOREIGN PATENT DOCUMENTS

| EP | 1182816 | 2/2002 |
| WO | WO03049449 | 6/2003 |
| WO | WO2004066706 | 8/2004 |

OTHER PUBLICATIONS

Pastrana-Vidal et al., "Metrique Perceptuelle des Rupture de Fluidite Video sans Reference", 9EMES Journees D'Etudes Et D'Echanges, Lille, May 25-26, 2004.
Osterberg et al., "Receiver-Controlled Joint Source/Channel Coding on the Application Level, for Video Streaming Over WLANS", VTC 2003-Spring, The 57th IEEE Semiannual Vehicular Technology Conference, vol. 3, Korea, Apr. 22-25, pp. 1558-1561.
Search Report Dated Aug. 11, 2009.

\* cited by examiner

*Primary Examiner* — Bryce Bonzo
(74) *Attorney, Agent, or Firm* — Jack Schwartz and Associates, PLLC

(57) ABSTRACT

The present invention relates to the domain of reception and transmission of data streams, for example audio and video. More specifically, the invention relates to the optional use of an error correction stream associated with a data stream.

10 Claims, 6 Drawing Sheets

METHOD FOR RECEIVING DATA STREAMS AND CORRESPONDING METHOD FOR TRANSMISSION

This application claims the benefit, under 35 U.S.C. §365 of International Application PCT/EP2009/058127 filed Jun. 29, 2009, which was published in accordance with PCT Article 21(2) No WO2010/000705A1 on Jan. 7, 2010 in English and which claims the benefit of French patent application No.08 54 400, filed Jun. 30, 2008.

1. SCOPE OF THE INVENTION

The present invention relates to the field of reception and transmission of data streams, for example audio and video. More precisely, the invention relates to the optional use of error correction streams associated with a data stream.

2. TECHNOLOGICAL BACKGROUND

According to the state of the art, a data stream, such as an audio and/or video stream, transmitted through a packet transport network, is associated with one or several error correction streams, for example FEC (Forward Error Correction). According to the state of the art, a data stream receiver is capable of using one or several error correction streams to correct errors which can be identified during the reception of the data stream.

An error correction stream associated with a data stream includes redundancy data. This data allows a receiver to correct errors at reception, for example packets or data lost or received with errors. A data stream receiver, which receives one or several associated error correction streams, can then correct a number of errors in the data stream received by using an operation comprising the use of packets correctly received from the data stream and the use of redundancy data.

A data stream correction by using one or several associated error correction streams allows recovery of up to, for example, 20% of packet loss in the data stream without affecting the rendering property of a video stream, according to the encoding parameters of the error correction stream at transmitter level.

This technique thus allows considerable improvement of the rendering quality of a video stream in the case of packet loss or in the case of reception of erroneous packets, for receivers which are subjected to these types of disturbances.

However, the generation of an error correction stream by a transmitter, as well as the use of one or several correction streams by a receiver have a non-negligible impact for the transmitter and for the receiver, in terms of CPU (Central Processing Unit) load, of transmission delay, and/or of decoding delay, resulting in a display delay during a channel change or "zapping", and/or also in terms of occupation of the transport network or of use of the network bandwidth, which can limit the number of data streams which can be transmitted on a packet transport network.

The standard for the transmission of video and/or audio services "DVB-IP" is available at the ETSI under the number ETSI TS 102 034 whose title is "Digital Video Broadcasting (DVB); Transport of MPEG-2 TS based DVB services over IP based networks (DVB-IPI)" is an example of the use of error correction streams into a packet transport network.

According to the prior art, the use of one or several error correction streams associated with a data stream is predetermined for a set of receivers, even if some receivers encounter few errors, which penalises the transmitter as well as the receivers relating to the terms described above (CPU load, zapping time, occupation of the broadcast network). The data stream and the error correction stream(s) are often transmitted on multicast broadcast addresses, in order to make these streams available for a high number of receivers.

So, the state of the art has the disadvantage of non-optimized management, of error correction stream(s) associated with a data stream, through a packet transport network.

3. SUMMARY OF THE INVENTION

The purpose of the invention is to overcome the disadvantages of the prior art.

More particularly, the purpose of the invention is to optimize the use of error correction stream(s) associated with a data stream, transmitted through a packet transport network.

For this purpose, the invention proposes a method for receiving data stream(s) through a packet transport network. In order to optimize the reception, the method includes the following steps: a step for receiving a data stream; a step for receiving one or several error correction streams associated with the data stream; a step for changing in state of activation, of an error correction by use of one or more error correction stream(s) associated with the data stream according to one or more changes in the state of activation of an error correction.

According to a variant of the reception method, the criterium of change in state comprises the reception quality of the data stream determined by the receiver.

According to a variant of the reception method, the criterium of change in state comprises a reception of a signal of change in state.

According to a variant of the reception method, the signal of change in state is comprised in the data stream received.

According to a variant of the reception method, the reception quality of the data stream comprises a number of video freezes observed.

According to a variant of the reception method, the determination of the reception quality of the data stream comprises a number of lost packets.

The invention also relates to a method for transmitting data streams through a packet transport network, which comprises the following steps: a step of transmission of a data stream comprising one or several error correction streams associated with the data stream to one or several receivers, a step of reception of an item of information representative of a reception quality of the data stream of the mentioned one or several receivers, a step of transmission of a signal of a change in state of activation of an error correction by a use of the mentioned one or several receivers, the signal being transmitted to destination of the mentioned one or several receivers according to a reception quality determined from the information representative of the reception quality received from the mentioned one or several receivers.

According to a variant of the transmission method, the determination of the reception quality of the data stream comprises a number of video freezes observed by one or several receivers.

According to a variant of the transmission method, the determination of the reception quality of said data stream comprises a number of lost packets.

According to a variant of the transmission method, the signal of change in state is comprised in said data stream.

4. LIST OF FIGURES

The invention will be better understood, and other specific features and advantages will emerge upon reading the following description, the description making reference to the annexed drawings wherein:

FIGS. 1 and 2 show a block diagram of an infrastructure implementing the invention according to two different embodiments, FIG. 3 shows an example of a transmitter according to the invention which belongs to one of the infrastructures illustrated by FIGS. 1 and 2, FIG. 4 shows an example of a receiver according to the invention which belongs to one of the infrastructures illustrated by FIGS. 1 and 2;

5. DETAILED DESCRIPTION OF THE INVENTION

Figure 1:
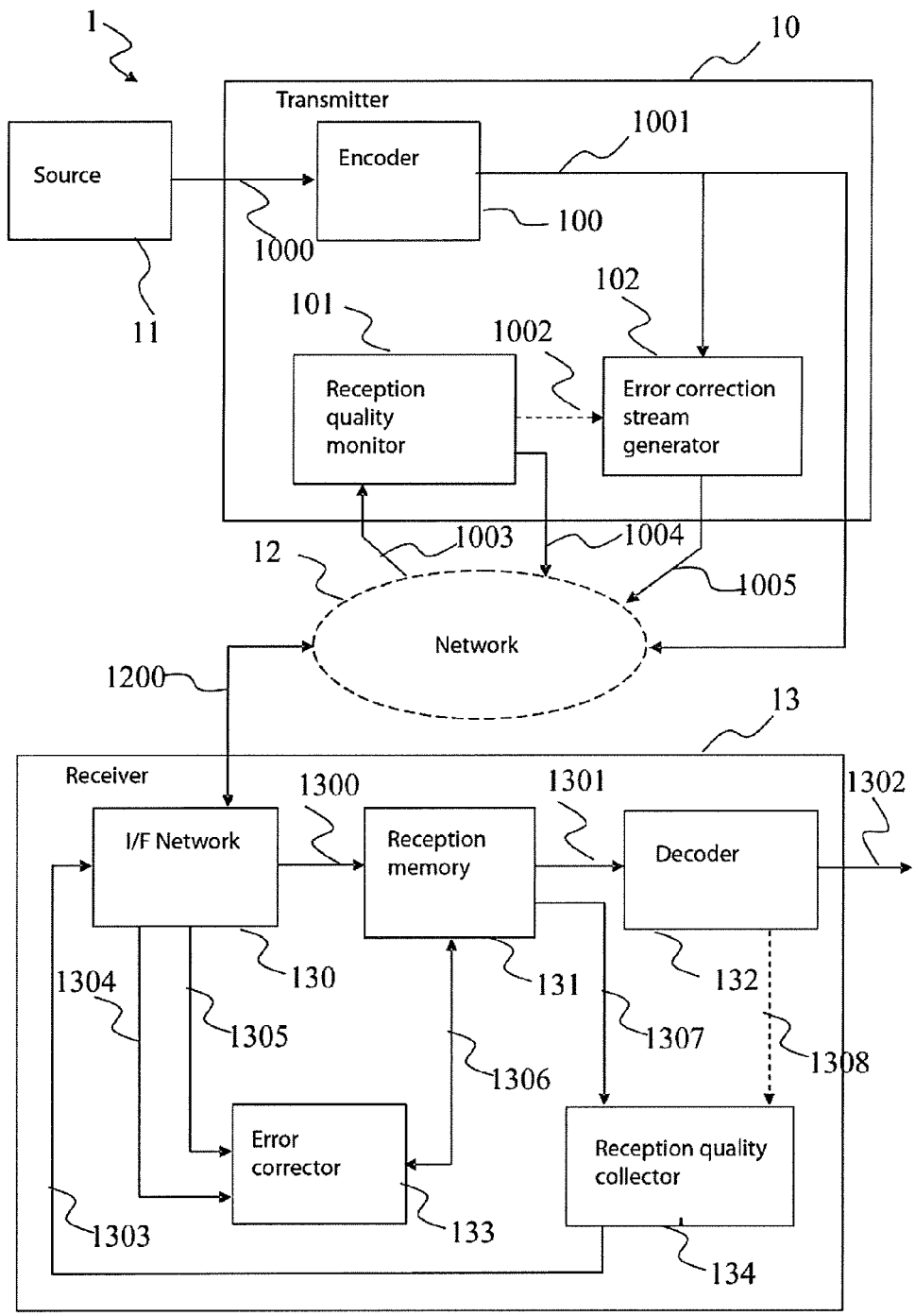

FIG. 1 shows a block diagram of an infrastructure 1 implementing the invention according to an embodiment.

The infrastructure 1 comprises:
a source 11,
a transmitter 10,
a receiver 13, and
a network 12.

The transmitter 10 comprises:
an encoder 100,
an error correction stream generator 102, and
a function for displaying (or "monitoring") the reception quality 101.

The encoder 100 is connected to the source 11 by a connection 1000 and to the network 12 by a connection 1001. The error correction stream generator 102 is connected to the encoder 100 by the connection 1001, and is optionally connected to the reception quality monitor by a connection 1005. The reception quality monitor 101 is connected to the network 12 by the connections 1003 and 1004.

The receiver 13 comprises:
a network interface 130,
a reception memory 131,
a decoder 132,
a reception error corrector 133, and
a collector of reception quality data 134.

The network interface 130 is connected to the network 12 by a connection 1200. The reception memory is connected to the network interface 130 by a connection 1300, by which the data stream is sent. The error corrector 133 is connected to the network interface 130 by two connections 1304 and 1305. The decoder 132 is connected to the reception buffer 131 by a connection 1301. The error corrector 133 is connected to the reception buffer 131 by a connection 1306. The decoder output corresponds to a connection 1302.

The source 11 provides data to be transmitted to the transmitter 10. The transmitter 10 receives this data, for example video data, in an encoder which encodes video data to a video stream compressed for example according to the standard H.264. The compressed stream that is output by the encoder is provided to the error correction stream generator 102, and also by the network 12 to the receiver 13. The error correction stream generator transmits one or several error correction streams associated with the data stream to the receiver 13 through the network 12 and the connection 1005. The reception quality monitor 101 receives the item of information representative of the reception quality of the receiver data flow 13 by the connection 1003. Then, the monitor 101 transmits by the connection 1004 a signal which indicates a change in state of activation of an error correction by the use of one or several error correction streams, according to a reception quality determined from the item of information received by the connection 1003.

The receiver 13 receives the data stream 1300 and one or several error correction streams transmitted through the connection 1305 associated with the data stream transmitted via the connection 1300. The receiver 13 also receives a signal of change in state of activation 1304 transmitted by the transmitter 10 via its connection 1200 to the network 12, and can in return transmit an item of information representative of the reception quality of the data stream 1303, that the transmitter receives via the connection 1003. The reception memory 131 is used as buffer, allowing a certain number of packets to be stored. The packet flow which exits the reception memory 131 feeds a decoder 132 by a connection 1301. The decoder 132 sends the decoded data stream on the link 1302. The error corrector 133 receives one or several error correction streams associated with the data stream through the connection 1305. The error corrector also receives a signal of change in state of activation of an error correction through the link 1304. According to the signal state, the error corrector 133 corrects or does not correct the data stream packets in the reception memory 131, using or not the error correction stream(s) received through the connection 1305.

So, the receiver 13 receives a data stream and one or several associated error corrections, and changes the state of activation of an error correction according to one or several criteria of change in the state of activation of an error correction.

According to an variant implementation of the invention, the receiver 13 includes a reception quality data collector 134 which reads in the reception memory via a connection 1307 to collect there an item of information representative of the reception quality, this item of information is then sent to the transmitter 10 by the connection 1301 which connects it to the network interface 130. However, it is not necessary that all the receivers of a set of receivers send this item of information. For a transmitter implementing the method of transmission according to the invention, it is enough to receive the item of information from one or several receivers (for example two, three, ten or more). So, the transmitter 10 can determine a reception quality, from the item of information received from one or several receivers, that is to say from receivers equipped with a collector 134 as described. The advantage of this is to allow the transmitter 10 to receive information about the reception quality of a limited number of receivers. This enables a reduction of the packet traffic on the network, and limits the impact on the CPU load of the transmitter (which processes less data) as well as the receivers, only one part of which, advantageously, collects information about the reception quality.

According to a variant implementation of the invention, the receiver sends the item of information representative of the reception quality of the data stream periodically. This has the advantage for a transmitter according to the invention to be constantly informed about the reception quality of a data stream by at least one receiver.

According to a variant implementation of the invention, the receiver sends the item of information representative of the reception quality of the data stream in case of reception quality change. This has the advantage of limiting the traffic of messages circulating on the network.

According to a variant implementation of the invention, the receiver sends the item of information representative of the reception quality of the data stream if a reception quality threshold is exceeded. This has the advantage of limiting the traffic of messages circulating in the network.

According to a variant implementation of the invention, the receiver sends the item of information representative of the reception quality of the data stream in case of zapping.

The variants described above for sending the item of information representative of the reception quality of the data stream can of course be combined in order to, particularly, provide in this way the advantage of proposing an efficient system in terms of limitation of the number of messages circulating in the network.

According to a variant implementation of the invention, the collector 134 of the receiver 13 uses a connection 1308 which connects it to the decoder 132, enabling the number of video freezes to be observed, an item of information which is, in this case, included in the item of information representative of the reception quality.

According to a variant implementation of the invention, the determination of the reception quality of the data stream by the transmitter 10 includes a number of video freezes observed by at least one receiver, detected from the item of information sent through the connection 1308 between the decoder 132 and the collector 134.

According to a variant implementation of the invention, the reception quality collector comprises a number of macroblocks observed in a video stream (a macroblock is a video image artefact, due to a decoding error, for example due to a packet loss) and detected from the item of information sent via the connection 1308 from the decoder 132 to the collector 134. These variants have the advantage of taking into account the "real" disturbance, directly experienced by one or several receiver users according to the invention.

According to a variant implementation of the invention, the reception quality collector 134 of the receiver 13 collects an item of information about a number of lost packets, this item of information being in this case included in the item of information representative of the reception quality. This enables having direct information on the reception quality of one or several data streams.

Of course, the variant implementations of the invention described above comprising a receiver 13 with a reception quality data collector 134 can be combined to include more data in the item of information representative of the reception quality, sent by the receiver 13.

According to a variant implementation of the invention, the reception quality monitor 101 of the transmitter 10 controls the error correction stream generator 102 via the connection 1002, in order to reinforce or lighten the error correction stream according to the reception quality determined. For example, the transmission of a column FEC coding is sufficient for a reception quality determined as being average, but the transmission of a column and line FEC coding is necessary for a reception quality determined as being bad. This has the advantage, for example, of enabling the impact on the occupation of the network bandwidth of network 12 as well as limiting the impact of using the error correction stream by the receiver 13, for example in terms of zapping time.

According to an implementation variant of the invention, the signal of change in state of activation of an error correction transmitted by the monitor 101 is inserted in the data stream. This has the advantage of not to oblige a receiver which implements the method of reception of the invention to put into place a specific connection for the reception of a signal of change in state of activation of error correction.

Figure 2:
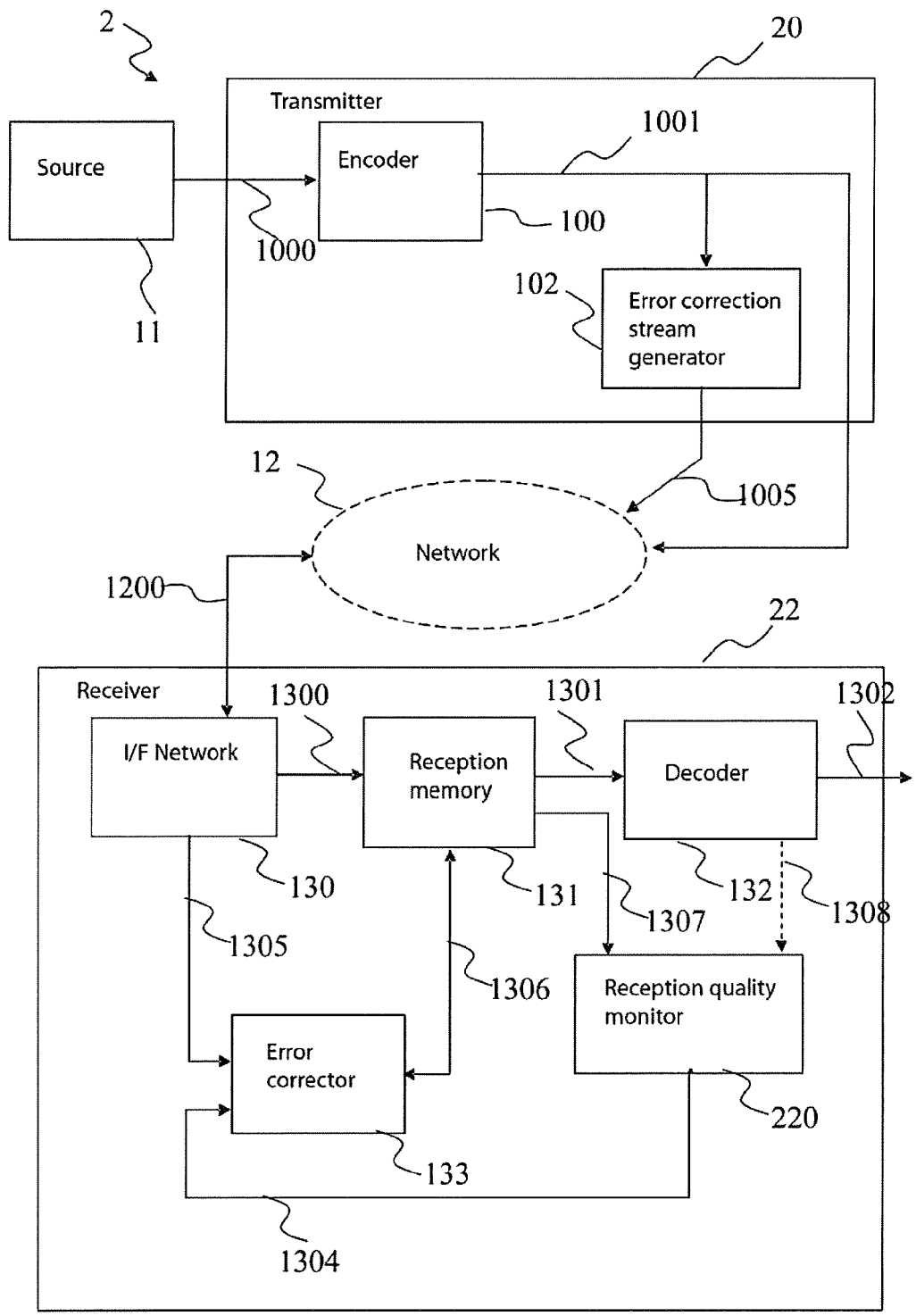

FIG. 2 shows a block diagram of an infrastructure 2 implementing the invention according to another embodiment. FIG. 2 comprises some elements which have already been described for the FIG. 1, which have a similar function in the FIG. 2 and which have the same references.

The infrastructure 2 comprises:
a source 11,
a transmitter 20,
a receiver 22, and
a network 12.
The transmitter 20 comprises:
an encoder 100, and
an error correction stream generator 102.
The receiver 22 comprises:
a network interface 130,
a reception memory 131,
a decoder 132,
a reception error corrector 133, and
a reception quality monitor 220.

In a variation of the transmitter 10 of FIG. 1, the transmitter 20 of FIG. 2 does not include a reception quality monitor 101. A component with a similar function is placed in the receiver 22. Unlike receiver 13 of FIG. 1, the receiver 22 of FIG. 2 includes a reception quality monitor 220. In FIG. 2, it is the reception quality monitor 220 which provides a signal of change in state to the error corrector 133 through the connection 1304; in FIG. 1, this signal is sent by the transmitter 20.

In this embodiment, the transmitter 20 sends one or several error correction streams transmitted by the error correction stream generator 102. This error correction stream is associated with a data stream transmitted by the encoder 100. The receiver 22 determines itself the reception quality using the reception quality monitor 220 and realizes a change in state of activation through the transmission of a change in state of activation signal to the error corrector 133 through the connection 1304. This change is realized according to a criterion of change in state of activation of an error correction, the criterion being the reception quality in this implementation. According to the state of this signal, the error corrector 133 uses or not the error correction stream(s) associated with the data stream.

According to a variant implementation of the invention, the reception quality monitor 220 of the receiver 22 comprises a connection coming from the decoder 132, which enables it to observe the number of video freezes. According to a variant implementation of the invention, the reception quality monitor 220 comprises the number of macroblocks observed in a video stream. This item of information is in this case taken into account in the determination of the reception quality.

According to a variant implementation of the invention, the reception quality monitor 220 collects the item of information representative of the reception quality of the data stream during a zapping. Then, the information collection is realized during the connection to the data stream, which in practice can provide a good idea of the reception quality a receiver can expect, and this enables the use of the error correction stream to be activated or deactivated and limit the impact on the decoding, because taking one or several error correction streams into account or not is in this case carried out at the connection time and not during the connection, which avoids decoding errors.

According to a variant implementation of the invention, the reception quality monitor 220 collects the item of information representative of the reception quality of the stream in a periodical manner.

According to an implementation variant of the invention, the signal of change in state of activation is transmitted by the reception quality monitor 220 when the reception quality determined by this one exceeds a predetermined threshold. For example, a signal of change in state of activation "switch on" is sent when the number of lost packets reaches the threshold of 3%, or when the number of video freezes exceeds the threshold of 1 video freeze per minute, or when the number of macroblocks in a video image exceeds 1 macroblock per 5 minutes. However, a "switch off" signal is sent when the number of lost packets or the number of video freezes goes below this threshold. These criteria can be combined to increase the efficiency of the reception method according to the invention. A change delay or taking into account a margin in the thresholds can be implemented to avoid a switching back and forth between the sending of a signal of change in state. For example, once the "switch on" signal is sent, a "switch off" signal is sent only after a certain time during which no reception error is noted, or, once the "switch on" signal is sent after having noted that a threshold of 3% of lost packets has been exceeded, the "switch off" signal will be sent only when the percentage of lost packets goes below the threshold of 1%.

According to a variant embodiment of the invention, the signal of change in state is transmitted when the reception quality reaches a predetermined value, such as for example ten lost packets, or when a video freeze is observed.

These embodiments can be combined with each other, when for example the "switch on" signal is transmitted if the number of lost packets exceeds the threshold of 10%, or if a video freeze is observed.

Figure 3:
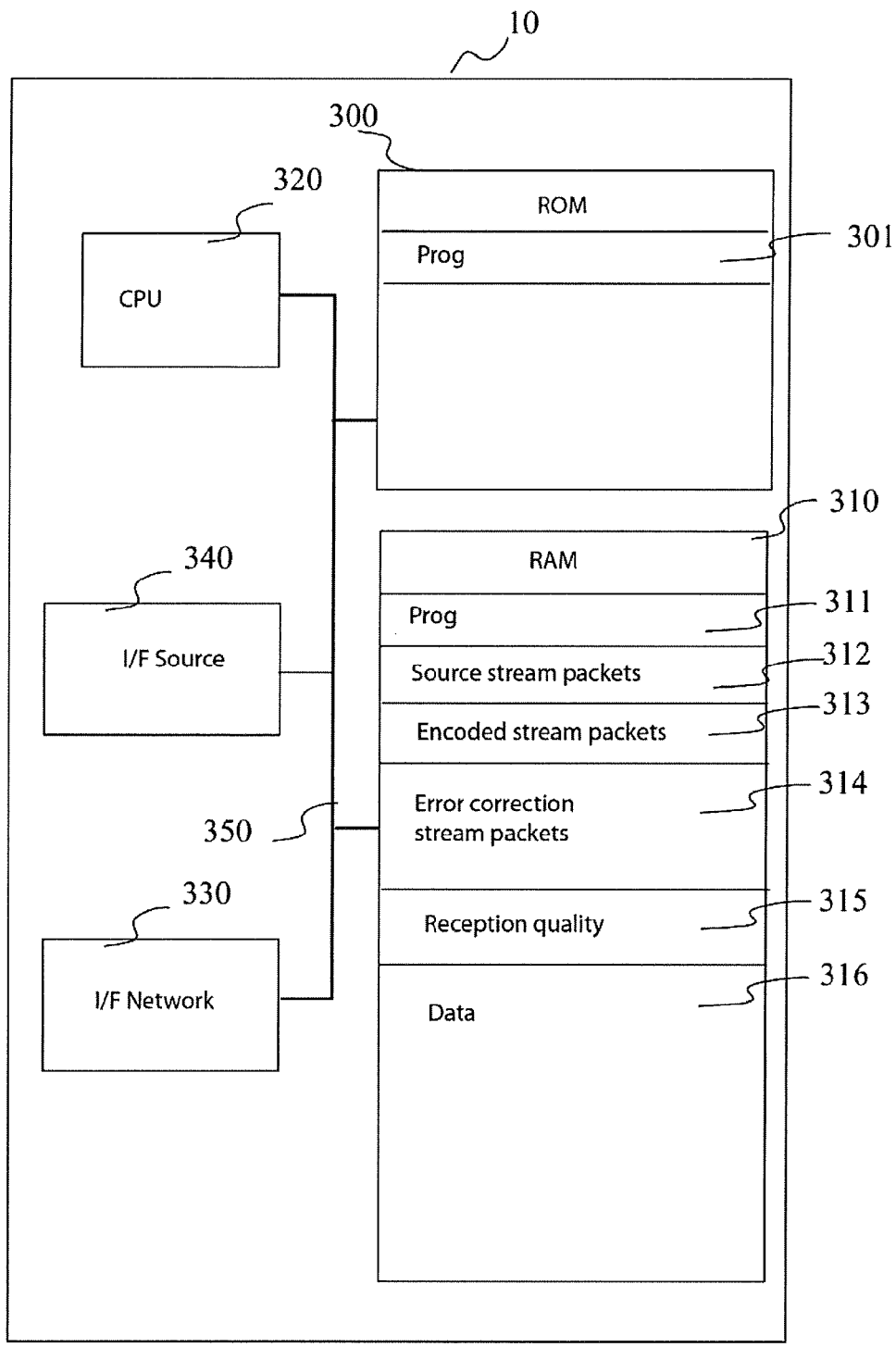

FIG. 3 illustrates schematically the transmitter 10 of FIG. 1 according to a particular embodiment of the invention. The transmitter 10 comprises, interconnected by an address and data bus 350:

a CPU 320,
a non-volatile memory of type ROM (Read Only Memory) 300,
a Random Access Memory or RAM 310,
a network interface 330 enabling packets of a packet transport network to be transmitted and received, and
a source interface 340 enabling reception of a data stream to be encoded.

Figure 4:
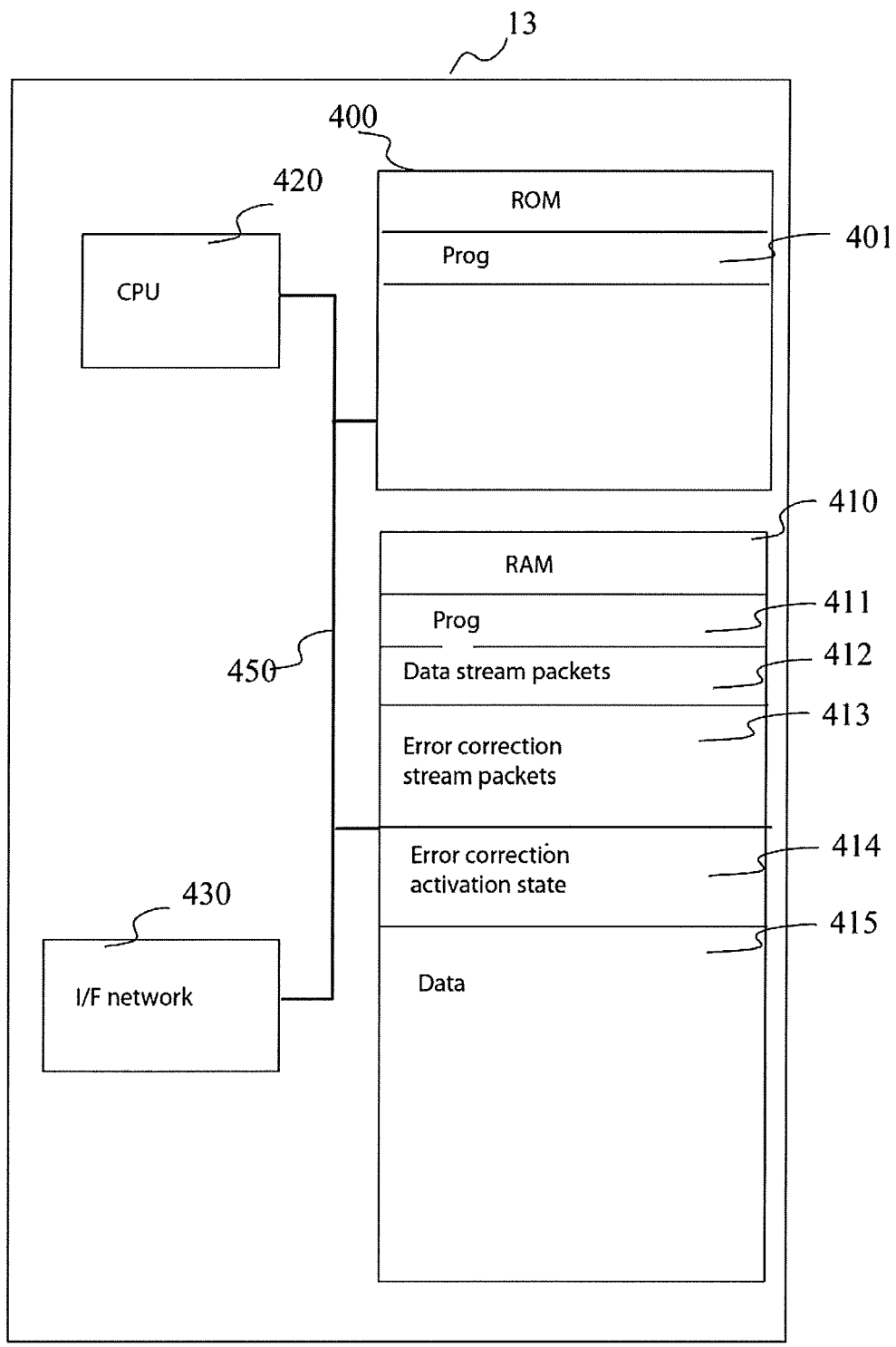

It is noted that the word "register" used in the description of memories described here designates in each of the memories mentioned with regard to FIGS. 3 and 4, a memory area of low capacity (some binary data) as well as a memory area of large capacity (enabling a whole programme to be stored or all or part of the data transmitted or received).

The ROM memory 300 includes among others:
a programme "prog" 301.

The algorithms implementing the steps of the method described hereafter are stored in the memory ROM 300 associated with the transmitter 10 implementing these steps. When powered up, the CPU 320 loads and executes the instructions of these algorithms.

The Random Access Memory 310 comprises notably:
in a register 311, the operating programme of the CPU 320 that is charged with the powering up of the transmitter 10,
a register 312 comprising a part of the source stream to be encoded,
a register comprising a part of the encoded data stream, in a register 313,
a register comprising a part of the error correction stream or streams, in a register 314,
a register 315 comprising information representative of the reception quality, and
a data area 316 enabling the temporary storage of date required for the correct operation of the transmitter 10.

FIG. 4 diagrammatically illustrates a receiver 13 from FIG. 1 according to a particular embodiment of the invention. The receiver 13 comprises the following elements, connected together by an address and data bus 450:

a CPU 420,
a non-volatile ROM type memory 400,
A Random Access Memory or RAM 410, and
A network interface 430 enabling transmission and reception of packets from a packet transport network.

The ROM memory 400 comprises notably:
a programme "prog" 401.

The algorithms implementing the steps of the method described hereafter are stored in the ROM memory 400 associated with the receiver 13 implementing these steps. Upon powering up, the CPU 420 loads and executes the instructions of these algorithmes.

The Random Access Memory 410 comprises notably:
in a register 411, the operating programme of the CPU 420 that is loaded upon the powering up of the receiver 13,
a register 412 comprising a part of the received data stream,
a register 413 comprising a part of the error correction stream or streams,
a register 414 comprising the state of activation of the error correction, and
a data area 415 enabling the temporary storage of data required for the correct operation of the receiver 13.

Other structures than those described with regard to FIGS. 3 and 4 are compatible with the invention. In particular, according to variants, the invention is implemented according to a pure hardware realisation, for example in the form of a dedicated component (for example in an ASIC (Application Specific Integrated Circuit) or FPGA (Field-Programmable Gate Array) or VLSI (Very Large Scale Integration) or of several electronic components embedded in an apparatus or even in a form of a mix of hardware elements and software elements.

Figure 5:
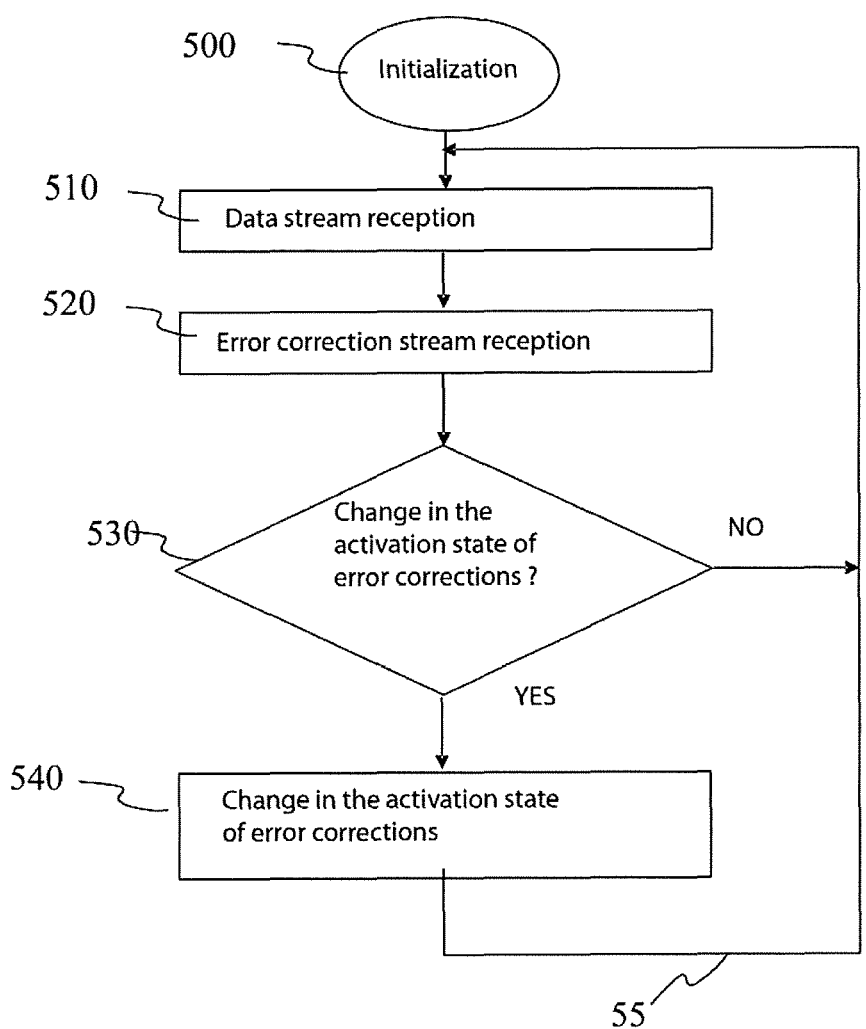
FIG. 5 illustrates a method for reception of a data stream according to the invention.

FIG. 5 represents, in algorithm form, a reception method according to the invention implemented in the receiver 13 or 22.

The reception method starts with a step 500 during which different variables required for its correct operation are initialized.

Then, during a step 510, the receiver 13 or 22 receives a data stream.

Then, during a step 520, the receiver 13 or 22 receives one or more error correction streams. According to variants, step 520 is carried out totally or in part, before or at the same time as step 510.

During a test step 530, the receiver 13 or 22 checks if a change in the state of activation of an error correction would be useful or necessary, for example according to the criteria such as those cited below.

In the affirmative, during a step 540, a change in the state of activation of an error correction is carried out, and the step 510 is reiterated.

In the negative, no state of activation change is carried out, and step 510 is reiterated.

According to a variant implementation of the invention, the reception method comprises a reception step of a request to send information representative of the reception quality of the data stream.

According to an advantageous implentation mode of the invention, at least one change in the state of activation of an error correction criterium comprises one or more of the following criteria:
a number of video freezes observed by one or more receivers,
a number of macroblocks observed by one or more receivers,
a number of lost packets, observed by one or more receivers, and a number of packets received with errors, observed by one or more receivers.

Figure 6:
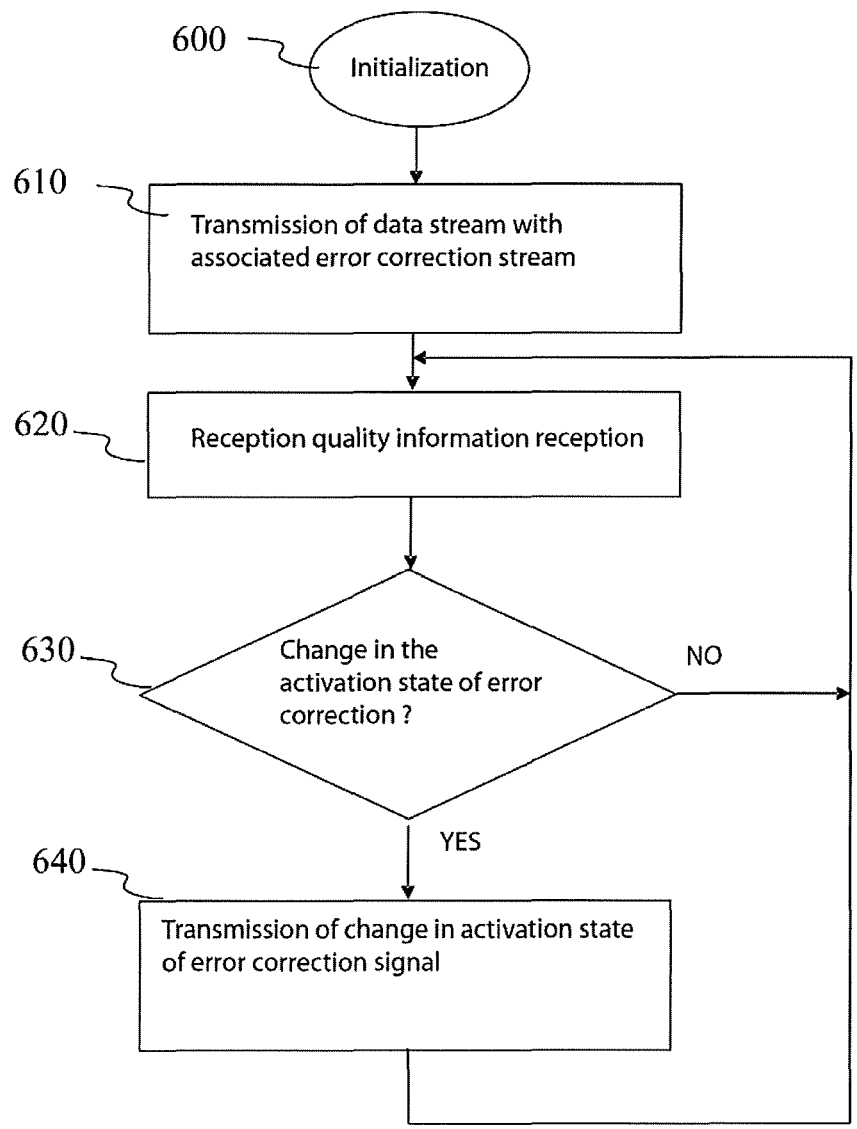
FIG. 6 illustrates a method for transmission of a data stream according to the invention.

FIG. 6 represents, in algorithm form, a transmission method according to the invention implemented in the transmitter 10.

The transmission method starts with a step 600 during which different variables required for its correct operation are initialized.

Next, during a step 610, the transmitter 10 transmits a data stream with at least one associated error correction stream.

During a step 620, the transmitter 10 receives an item of information representative of the reception quality of at least one receiver.

During a test step 630, the transmitter 10 checks if a change in the state of activation of an error correction would be useful or necessary, according to at least one criterium of change in the state of activation of an error correction.

In the affirmative, during a step 640, a change in the state of activation of an error correction signal is transmitted, and at step 620 is reiterated.

In the negative, no signal of change in state of activation is transmitted, and step 620 is reiterated.

According to an advantageous implementation of the invention, at least one criterium of change in state of activation of an error correction comprises one or more of the following criteria:
 a number of video freezes observed by one or more receivers,
 a number of macroblocks observed by one or more receivers,
 a number of lost packets, observed by one or more receivers, or even by one or more items of network equipment, and
 a number of packets received with errors, observed by one or more receivers.
 the number of items of network equipment where the receivers observe loss of packets or observe the reception of packets with errors.

These criteria can be combined, for example to determine the reception quality it could be of interest to know the number of receivers that have observed a loss of packets of more than 1% from the video streams received.

According to a variant implementation of the invention, the method of transmission comprises a transmission step of a request for the transmission of information representative of the quality of reception of data stream. This also enables to only receive information from certain receivers, for example in particular receivers that are in a part of the network where the reception must be tested more precisely.

According to a variant implementation of the invention illustrated by previously described FIGS. 5 and 6, the change in the state of activation of an error correction is carried out when the value of at least one criterium is greater than a maximal value of one or more determined criteria, or less than a minimal value of one or more determined criteria. For example, if the maximal value of the number of video freezes is equal to five, when the number of video freezes exceeds five video freezes per hour, a change in the state of activation of an error correction to a "switch on" state is performed. If the minimal value of the number of video freezes is equal to one, when the number of video freezes passes below one video freeze per hour, a change in the state of activation of an error correction to a "switch off" state is performed.

According to a variant implementation of the invention illustrated by FIGS. 5 and 6, the change in the state of activation of an error correction is carried out when a value relative to at least one criterium is exceeded. For example, when the number of packets lost becomes greater than 2% of the number of packets of the data stream received, change in state of activation of an error correction to a "switch on" state is performed. When the number of packets lost becomes less than 0.1% of the number of packets of the data stream received, a change in state of activation of an error correction "switch off" is performed.

These variant implementations of the invention can be combined together, to increase their efficiency.

If several criteria are taken into account, possible conflicts can be managed by attributing a priority level relative to each criterium, or by attributing a logical operation: for example, if the number of freezes exceeds a maximal threshold, but the number of packets lost is below the minimal value, a change in the state of activation of an error correction "switch on" is performed, the criterium of the number of video freezes being more important in the determination of reception quality (the highest priority is given to the criterium for the number of video freezes). If the number of packets lost passes below a minimal threshold, the change in state of activation is however not carried out if the number of video freezes has not passed below a minimal threshold (AND logical operation).

The measurement of these criteria can be made continuously, or periodically, randomly or during an event (for example during zapping). These different ways of taking the measurement for the reception quality can be combined together.

Naturally, the invention is not limited to the embodiments previously described.

Notably, several steps of the method for reception and of the method for transmission can be executed in parallel, such as the reception of frames, encapsulation, and the transmission, by adding means of communication and buffer memory zones between these steps. This has notably the advantage of enabling a separation of specific tasks.

In addition, the reception method, as well as the transmission method can be implemented not only by a single device, but by a set of distinct devices.

The architecture of infrastructures 1 and 2 as described by FIGS. 1 and 2 can comprise other devices required for correct operation. For example, several transmitters can be required to provide an enriched service offer. For example, a management server can manage the transmitter or transmitters via a LAN (Local Access Network) internal network. Such a management server can also manage the subscriptions of users of receivers to different service offers. For example, items of network equipment such as routers and switches and specific for the transport protocol used can be necessary to access to the network 12. For example, the network 12 is a network commonly called an optical fibre "backbone" with ATM protocol, enabling a very high bitrate and a guaranteed bitrate. For example, the receivers are connected to this backbone by distribution centres comprising DSLAMs (Digital Subscriber Line Access Multiplexer). For example, a receiver accesses a DSLAM via a telephone line and an ADSL (Asynchronous Digital Subscriber Line) modem. For example, the receiver accesses to the network 12 via a specific access device (gateway) comprising an ADSL modem, a router, a Firewall, a wireless transmitter/receiver, etc, and can connect more than one receivers to it at the same time.

The type of network used can be wired, as shown here, but also wireless, using techniques such as WiFi, DVB-H (standard DVB for wireless portable devices), DVB-T (standard DVB for the reception of digital television and radio via terrestrial signal), or DVB-S (standard DVB for the reception of digital television and radio via satellite signal) or again according to the standard ATSC (Advanced Television Systems Committee).

In addition the architecture of the devices featuring in the infrastructures 1 and 2 of FIGS. 1 and 2 can be different. For example, several generators of error correction streams can be added to provide error correction stream(s) particularly adapted to a section of the set of receivers. For example, the error corrector 133 of a receiver 13 or 22 according to respectively FIG. 1 or 2 links the reception memory 131 to the decoder 132.

The method for reception, as well as the method for transmission can be implemented using configuration, administration, control and diagnostic protocols, according to for example the protocol SNMP or the protocol CWMP an its extensions (Consumer Premises Equipment—Wide Area Network Management Protocol). The invention can be implemented using the protocol SNMP (Simple Network Management Protocol) positioning an SNMP "manager" at the level of the transmitter and an SNMP "agent" in the receiver and adding an MIB (Management Information Base) with a specific attribute for the management of change in the state of activation of an error correction by use of one or more error correction streams. For this implementation, an "MIB attribute" can be added at the level of the receivers, known as "fecConfiguration" of the enumerated type, admitting the values described hereafter, accessible in read and write:
    FEC_NONE (enum value 0),
    FEC_FORCED (enum value 1), and
    FEC_AUTO (enum value 2).

The value FEC_NONE signifies that no error correction by use of one or more error correction streams is to be done by the receiver. The value FEC_FORCED signifies that the receiver must necessarily use the error correction stream or streams. The value FEC_AUTO signifies that the receiver must determine itself if a change in the state of activation of an error correction by use of one or more error correction streams is to be performed, according to the criteria as described here previously. In the first two cases (FEC_NONE and FEC_FORCED), it is the transmitter that determines if a change in the state of activation of an error correction by use of one or more error correction streams is necessary, according to one or more criteria as described here previously.

The invention can also be implemented using the protocol CWMP and by adding an ACS (Auto Configuration Server) at transmitter level. In the receiver, a CWMP agent is added as well as an object in the receiver comprising the specific attributes for the management of change in the state of activation of an error correction by use of one or more error correction streams. In the terms of the CWMP standard, the receiver is called the CPE, and for one CPE there are two error correction activation modes: a "forced" mode and an "automatic" mode. In "forced" mode the CPE changes the state of activation of an error correction by use of one or more correction streams according to a signal of change in state, sent by a transmitter; it is the transmitter that determines the change in state according to at least one change criterium. In "automatic" mode, it is the CPE itself that changes the state of activation according to at least one change criterium, determined by itself. The function in the receiver that makes an error correction by us of one or more error correction streams is called the "FEC module" or "FEC decoder"

For this implementation, a FEC object is added in the data structure as defined by the standard TR-135 (defined by the Broadband Forum). This FEC object is part of the object .STBService.{i}.Components.FrontEnd.{i}.IP as defined in TR-135.

This FEC object contains the following four parameters:
    Enable,
    ForceFECEnable,
    OperationMode,
    AutoModeFECDecoderStatus.

The first two (Enable, ForceFECEnable) are parameters in write only access. The next two (OperationMode, AutoModeFECDecoderStatus) are in read only access.

The Enable parameter is of boolean type. It enables activation or deactivation of the FEC module. Writing of the value 1 in the Enable parameter causes the activation of the FEC module in automatic operating mode. This means that the receiver must determine itself if a change in the state of activation of an error correction by use of one or more error correction streams is to be performed, according to the criteria described here previously. Writing the value 0 in the Enable parameter causes the FEC module to be deactivated this means that no error correction by the use of one or more error correction streams is to be performed by the receiver. Writing 0 or 1 in the Enable parameter is done using the method SetParameterValue of protocol CWMP of Tr-069. It involves then use of a remote function that is encapsulated in a frame according to the http protocol. Among the parameters of this remote function, there is the parameter name, in this case the following sequence of characters: STBService.{i}.Components.FrontEnd.{i}.IP.FEC.Enable, as well as the value to be written in the boolean (0 or 1).

ForceFECEnable is a boolean type parameter. Writing the value 1 in the parameter Enable causes the activation of the FEC module in forced operating mode. This means that the receiver must necessarily use the error correction stream(s).

In the case where the FEC is deactivated or when it is forced, it is the transmitter that determines if a change in the state of activation of an error correction by use of one or more error correction streams is necessary, according to one or more criteria such as those described here previously.

In the automatic case, it is the receiver that decides on the activation or not of an error correction by use of one or more error correction streams, according to one or more criteria such as those described here previously.

OperationMode is a enumerated type parameter and contains a description in the form of character string of the operating mode of the receiver. "Disabled" indicates that the FEC is not activated. "Auto" indicates that the operating mode of the FEC is automatic (as described previously). The value "Forced" indicates that the activation was forced.

AutoModeFECDecoderStatus indicates, in the case where the operating mode is automatic, if the FEC decoder is operating or not. "FEC-ON" indicates that the receiver uses the FEC data to perform an error correction. "FEC-OFF" indicates that the receiver does not use the FEC data to perform an error correction.

An example of definition of an FEC object with its attributes, the value of the attributes and their significance is illustrated in the appendix.

The SNMP protocol is defined in a series of documents called RFCs (Request For Comment), such as RFC 1157: "A Simple Network Management Protocol". The CWMP protocol is defined by the document TR-069 and its various amendments and extensions (TR-098, TR-104, TR-106, TR-110, TR-111, TR-135, TR-140 et TR-142).

The embodiments as described above are examples of implementations, other embodiments are possible and compatible with the invention.

Notably, as concerns an implementation with the SNMP protocol, other MIB attributes can be put in place to manage the correction of errors by the use of one or more error correction streams. For example an attribute "errorCorrection" can be defined, that can take the values "on", "off", "auto", for "switch on", "switch off", that is to say forced by a transmitter, and for "automatic", that is to say to be determined by the receiver itself. For example, several MIB attributes can be put in place, to manage the change in state function, for example by separating the parameters that can be written from those that can be read by a transmitter.

In addition, as concerns the implementation with the CWMP protocol, other attributes than an FEC object and other parameters than those described can be used to implement the invention. For example, an error correction by use of one or more error correction streams can not use FEC codes, but for example Reed-Solomon. For example, the parameters can be combined together to simplify their use and limit the number of messages necessary between a receiver and a transmitter.

Appendix

Summary table of an implementation of the invention with the CWMP protocol: definition of objects, attributes, values and significance.

| .STBService.{i}.Components.-FrontEnd.{i}.IP.FEC. | Object | — | Parameters linked to the configuration of AL-FEC. |
|---|---|---|---|
| Enable | boolean | Write | Switches on or switches off the FEC decoder operation. The value TRUE places the CPE in automatic mode, that is the device decides itself if it switches on the FEC decoder or not. The value FALSE switches off the FEC decoder |
| ForceFECEnable | Boolean | Write | The value TRUE forces the CPE to use a FEC decoder. The value FALSE has no effect. |
| OperationMode | character string | Read | The operating mode of the FEC decoder. Enumeration of: "Disabled": Inhibited "Auto": Automatic "Forced": Forced "Error" (OPTIONAL): Error (optional) The value "Error" CAN be used by the CPE to indicate an error that has occurred locally. |
| AutoModeFECDecoderStatus | Series of characters | Read | The state of the FEC decoder in "automatic" operating mode. In this mode, the CPE decides itself autonomously if it switches on the FEC decoder or |

-continued

| .STBService.{i}.Components.-FrontEnd.{i}.IP.FEC. | Object | — | Parameters linked to the configuration of AL-FEC. |
|---|---|---|---|
| | | | not. This parameter indicates if the CPE operates an FEC decoder or not, at the instant of interrogation. Enumeration of: "FEC-ON": FEC decoder switched on "FEC-OFF": FEC decoder switched off "Error" (OPTIONAL): Error (optional) The value "Error" CAN be used by the CPE to indicate an error that has occurred locally. |

The invention claimed is:

1. A method for the reception of a data stream, via a packet transport network, wherein the method comprises the following steps implemented in a receiver:
   reception of a data stream;
   reception of at least one separate error correction stream that is associated with said data stream;
   reception of a signal of change in state of activation of an error correction by a use of said at least one separate error correction stream, said signal of change being representative of one of at least the following modes: a mode of self-determination by said receiver to use said at least one separate error correction stream, or a mode of forced use of said at least one separate error correction stream by said receiver;
   a change in state of activation of an error correction by a use of said at least one separate error correction stream according to said signal of change in state of activation, said receiver self-determining said use of said at least one separate error correction stream according to at least one criterion of change in state of activation of an error correction if said signal is representative of said self-determination mode, or said receiver forcibly using said at least one separate error correction stream if said signal is representative of said mode of forced use.

2. The method according to claim 1, wherein the criterion of change in state comprises a reception quality of said data stream determined by said receiver.

3. The method according to claim 1, wherein the criterion of change in state of activation comprises reception of a signal of change in state.

4. The method according to claim 1, wherein the signal of change in state is comprised in the received data stream.

5. The method according to claim 2, wherein the reception quality of said data stream comprises a number of observed video freezes.

6. The method according to claim 2, wherein the determination of the reception quality of said data stream comprises a number of lost packets.

7. A method for data stream transmission, via a packet transport network, wherein it comprises the following steps:

transmission of a data stream and at least one separate error correction stream associated with said data stream to at least one receiver, reception of an item of information representative of a reception quality of said data stream of at least one of said at least one receiver, a transmission of a signal of change in state of activation of an error correction by a use of said at least one error correction stream, said signal being transmitted to destination of said at least one receiver, according to a reception quality determined from said information representative of said reception quality received from said at least one receiver, said signal of change in state being representative of one of at least the following modes: a mode of self-determination by said receiver to use said at least one separate error correction stream, or a mode of forced use of said at least one separate error correction stream by said receiver.

8. The method according to claim 7, wherein the determination of said reception quality of said data stream comprises a number of video freezes observed by said at least one receiver.

9. The method according to claim 7, wherein the determination of reception quality of said data stream comprises a number of lost packets.

10. The method according to claim 7, wherein the signal of change in state is comprised in said data stream.

* * * * *